July 5, 1938. J. P. HUFLER ET AL 2,122,941
PHOTOCELL HOUSING
Filed Jan. 22, 1934
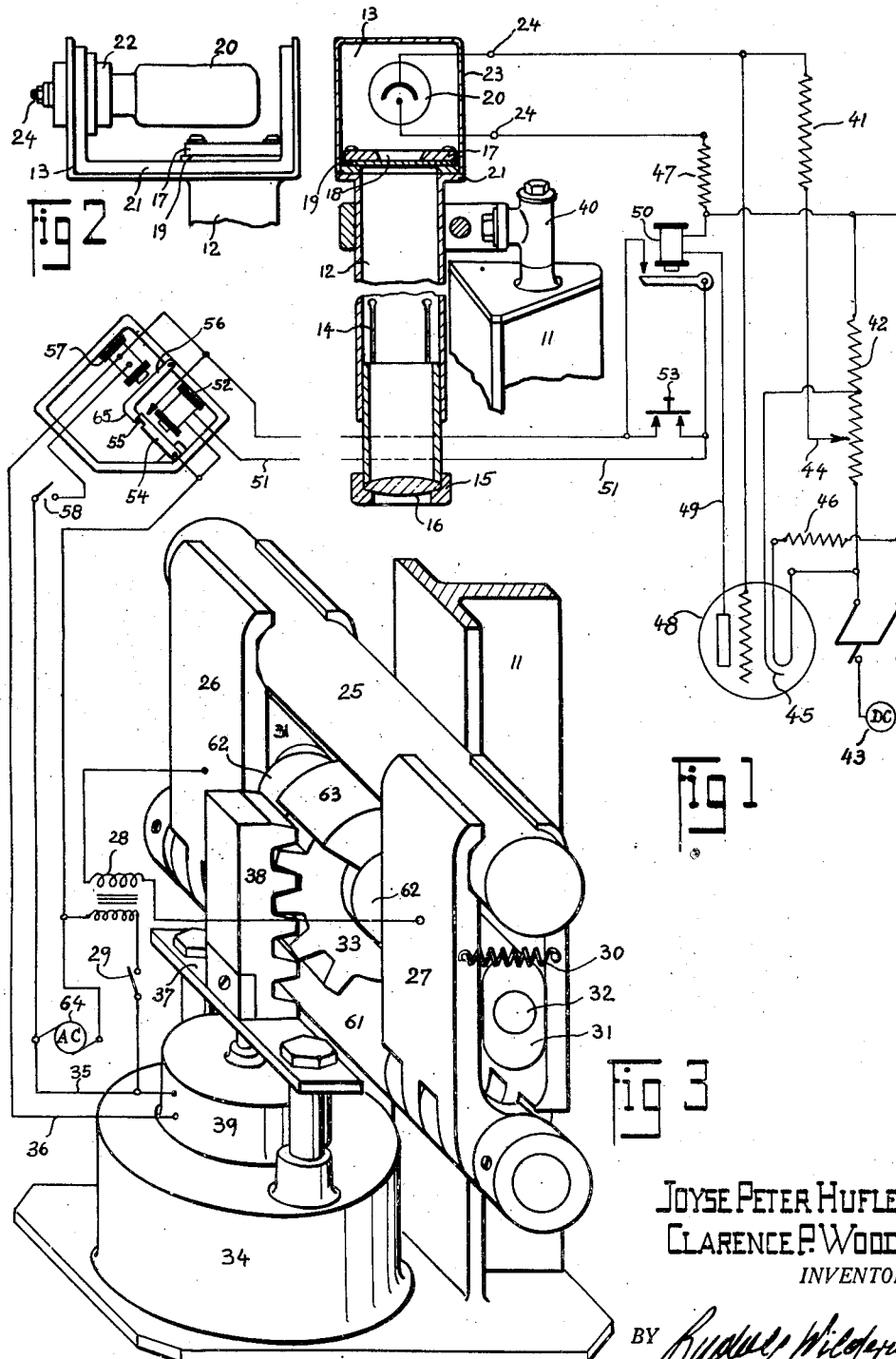
JOYSE PETER HUFLER &
CLARENCE P. WOOD
INVENTORS
BY *Rudolf Wilderman*
ATTORNEY Patented July 5, 1938

2,122,941

UNITED STATES PATENT OFFICE 2,122,941

PHOTOCELL HOUSING

Joyse Peter Hufler and Clarence P. Wood, New York, N. Y., assignors to Polymet Manufacturing Corporation, New York, N. Y., a corporation of Delaware Application January 22, 1934, Serial No. 707,861

2 Claims. (Cl. 250—41.5)

This invention relates to a temperature control, as for instance applied to industrial heating appliances, for scientific research, in lighting, etc., and more particularly it is directed to a method of and means for determining or controlling temperatures by measuring the radiation,—for instance visible radiation,—of an object at a point which is to be heated to a predetermined or critical temperature.

In industrial appliances it is often desirable, be it for annealing, tempering, sintering or in preparation for mechanical or other treatments, to raise the heat of an object, as a whole or in parts, to a predetermined temperature, and then to interrupt the application of heat or to modulate it, as circumstances may require. In the past such temperature has mostly been controlled indirectly by checking the temperature of the surrounding atmosphere for instance in a furnace or by gaging the energy consumed in heating, but in practically all instances a number of incidental or collateral factors affect the heating and it may happen that the object is not actually heated to the temperature of the heating chamber or to the temperature corresponding to the energy consumed.

It is one object of this invention to read directly the temperature of the object to be heated and to modulate the heat accordingly.

It is a further object of this invention to control the heating of an object by directly measuring the temperature thereof at a preferred point.

Still another object of this invention provides for temperature measuring and control means, which are readily changeable and adjustable in order to allow a control to different temperatures and to provide for a most accurate check at a wide range of temperatures.

Other objects of this invention concern the arrangement of the temperature measuring and control means in relation to the heated object. In this connection we provide for means which may be set up anywhere within a reasonable distance from the heated object but outside of the direct range of high temperatures and away from the space which should be reserved for the operator.

This invention in its preferred execution makes use of photo-electric means for measuring radiation, and other objects of this invention are directed to the optical means used in connection with, and to improvement in the circuits and in the circuit control means which are used in combination with the photo-electric means.

The objectives of this invention will be clarified and amplified in the following description of an exemplary execution of our invention in the light of the accompanying drawing, in which Fig. 1 shows a cross-sectioned front view of the optical and photo-electric circuit means used in connection with our invention.

Fig. 2 shows a detail side view of part of the photo-electric and optical apparatus.

Fig. 3 is a perspective representation of an exemplary heating apparatus to which the means of Fig. 1 are applied, together with a schematic view of the electric circuit of the actuating and control apparatus.

Similar numerals refer to similar parts throughout the various views.

While our invention is preeminently fitted for use in multiple arrangements, for instance in connection with a bank of furnaces, it is here exemplarily shown to be applied to one heating unit only and the various parts are supported by a single standard 11 (Figs. 1 and 3). Near the upper end of the standard 11 a tube 12 of the kind used in telescopes is swingably and vertically adjustably mounted (universal bracket and clamp 40) and carries an enclosure 13 at its upper end which serves to receive the photo-electric element.

The tube 12 is slotted near its lower end at 14, in order tensionally to engage upon an extension tube 15 which serves to hold the lenses required for focusing the radiation of the heated object into the enclosure 13. Such optical means are indicated by a lens 16 which is retained on tube 15 by means of a suitable collar. The distance of this lens from the enclosure 13 may be adjusted by moving the extension piece 15 up and down in the tube 12 which is frictionally engaged thereon.

At the point where the tube issues through an opening upon the enclosure 13, a plate, mask or window 17 is removably fastened upon the bottom of the enclosure 13 and is provided with a hole 18, which is substantially concentric with tube 12. The plate 17 serves to clamp translucent means 19, onto the bottom of the enclosure upon which the light directed by lens 16 is focused. These translucent means 19 may be a filter, ground or frosted glass or opalescent paper and they serve at the same time to diffuse the light projected thereonto in such a manner that it is evenly distributed onto photo-electric cell 20.

The enclosure 13 comprises a U-shaped frame 21. A socket 22 for the photo-electric cell 20 is mounted upon one shank of the said U-shaped frame, so that the light sensitive element thereof faces the hole 18 in plate 17, which serves as a diaphragm or mask. The edges of the frame 21 are recessed in order to accommodate the U-shaped cover 23 (omitted in Fig. 2); the angular corners of the recesses extending around frame 21 serve to prevent light from leaking into the enclosure between the frame 21 and the cover 23, so that enclosure 13 is a camera obscura. The terminals 24 are insulatedly mounted on the frame 21 and they may form part of the socket 22, serving to connect the photo-electric cell 20 into the photo-electric circuit.

The heated object, onto which lens 16 is trained, is in this illustration of our invention indicated as a rod 25, which is clamped at both ends between jaw-shaped electrodes 26 and 27; these electrodes are insulated from each other and are swingably mounted upon an extension 61 of the standard or riser 11. The electrodes 26 and 27 are connected to a suitable source of current, for instance to the secondary of the step-down transformer 28. The heating current may be controlled by means of a switch 29 in the primary of transformer 28.

The jaws of the electrodes 26 and 27 are tensioned into engagement upon the rod 25, for instance by means of springs 30. Between the jaws of the electrodes 26 and 27 extend insulated cams 31 which are mounted upon a shaft 32, said shaft being rotatably supported by forked bracket 62 upon the standard 11. Centrally upon shaft 32 is mounted a gear segment 33; by a rotation of shaft 32, cams 31 open the jaws of the electrodes 26 and 27 against the tension of springs 30. For the purpose of opening the jaws of the electrodes we may provide any suitable means which are preferably electrically controlled in order to provide for a convenient connection to the photo-electric circuit. In the drawing we indicate as a means for opening and closing the jaws of the electrodes a thruster 34 which is also known in the market as an electro-hydraulic operator (see General Electric pamphlet, EA-1262A).

A thruster of this kind comprises an electric motor 39 to which current is adduced by way of leads 35 and 36, said motor actuating a pump which in turn hydraulically raises the ram 37 to its top position and retains it in that position while actuated. When the motor 39 is not actuated the ram 37 drops down by reason of its weight; the ram 37 is operatively connected with segment 33 by means of a rack 38 upwardly extending therefrom and meshing with gear segment 33.

When rod 25 is not engaged by the jaws of electrodes 26 and 27 it is suitably supported, for instance by a heat resistant insulating segment 63 which is arranged complementary to gear segment 33.

The ram 37 of the thruster is shown in the drawing in the lowest position, the motor 39 standing idle. When the motor 39 is actuated, the ram 37 is raised, the rack 38 rotates the gear segment 33 and the cams 31 separate the jaws of electrodes 26 and 27 so that the bar 25 drops out onto a suitable platform for instance segment 63. The secondary circuit of the transformer 28 is thus broken or other means for breaking the current at or before the time of the opening of the jaws may be provided for as readily understood by those acquainted with this art, such other means being photo-electrically controlled as described below.

The extension tube 15 is adjusted so that the lens 16 focuses a picture of rod 25 faced by said extension tube onto the translucent means 19.

The translucent means 19 and the mask 17 regulate the light entering upon the enclosure 13. The admitted amount of light and the position of the translucent means relatively to the photo-electric cell may be adjusted by using a variety of suitably shaped masks. The amount of light propagated into the enclosure 13 may again be regulated by the density of the translucent means 19. The translucent means 19 may in some instance be a filter which selects any part of the spectrum to which the photo-electric tube 20 is to respond. It is thus seen that the mask and translucent means or filter lend themselves to a large variety of adjustments for modulating the intensity of the light measured and for selecting particular rays.

Furthermore the area of the heated object which is to be used for measurement may be enlarged or reduced by adjusting the level of tube 12 in a vertical direction; and such an area may be selected because the universal joint or other adjustable supporting means, interposed at 40 in the manner known to those acquainted with the mechanical arts, permit training of the optical device onto any point of the object the heat of which is to be observed.

The translucent means or filter 19 serves furthermore to diffuse the light projected thereonto in such a manner that the photo-electric tube 20 is evenly irradiated, and that a uniform reaction is obtained.

The photo-electric tube 20 is comprised in a circuit together with the grid leak or input resistance 41 and the voltage divider 42, which is connected across a direct current source 43. A preferred voltage for said circuit is selected from the voltage divider 42 by means of an adjustable tap 44. Thus we have another means for adjusting the sensitivity of the photo-electric cell 20, which may be regulated at will during operation, so that the photo-electric cell will respond with maximum current changes to any preferred intensity of the light it is exposed to. The drop across the input resistance 41 responds to the current fluctuations in the photo-electric cell 20 and it is therefore connected as an input resistance into the grid circuit of a triode 48 which is shown to comprise an indirectly heated cathode 45 connecting to a central point of the voltage divider 42. The heater element is connected across the D. C. source 43, a suitable resistance 46 being connected in series.

In order to allow the use of maximum currents in connection with the photo-electric cell 20 without exposing said cell to undesirable ionization, an additional resistance 47 is included in the circuit of said cell but excluded from the grid circuit of the triode 48. The anode circuit 49 of the triode 48 comprises a sensitive relay 50 which is actuated by the current of the said anode circuit when a predetermined current is set up in the photo-electric cell in reaction to a certain amount of light, and which then closes circuit 51.

The circuit 51 comprises the coil of relay 52. A push button 53 is connected in parallel with the sensitive relay 50 so that the operator may actuate relay 52 when it is not actuated from the relay 50. The relay 52 controls the current adduced from the alternating current source 64 to the motor 39 of the thruster. The circuit controlled by relay 52 is normally open, but its circuit closing arm 54 is provided with an extension 55 which is engaged by a hook 65 on lever 56 when the arm 54 is in a circuit closing position. The lever 56 represents the pole piece of a relay 57 so that the lever 56 releases the arm 54 when the relay 57 is energized. The coil of relay 57 is fed from the alternating current source 53 and is controlled by the manually operated switch 58.

Those acquainted with the respective art will understand that our optical device may be trained onto any artificial or natural source of light, that the photo-electric cell may be controlled in any other manner known at the present state of development, although the particular arrangement shown offers particular advantages for purpose of accuracy and flexibility; and that the operating circuit comprising the two circuit closing relays 50 and 52 and the control relay 57 may be replaced as circumstances require.

The circuits and the device shown cooperate as follows:

For the start it is of course desirable that the jaws of the heating electrodes are open. If they are not open the operator operates push button 53 which closes the circuit of relay 52 and in turn the motor 39 is actuated opening the jaws of the electrodes against the gravitational action of the ram 37 and/or the action of springs 30. The object to be heated is inserted between the jaws and the operator closes switch 58 actuating relay 57, which in turn stops the motor 39, because the circuit of said motor is broken by the arm 54, when it is released by lever 56 and drops to the left.

When the motor 39 has been stopped the ram drops and the jaws of the electrodes grip the rod 25, the secondary circuit of transformer 28 is closed thereby or said secondary circuit may be excited by then closing switch 29. The rod 25 is now being heated up to incandescence and when such incandescence reaches the point where the light as propagated from the selected area of said rod and as modulated by means of the mask 17 and the filter 19 causes a predetermined current to be sent from the photo-electric cell through the grid circuit 48, the relay 50 is actuated, closing relay 52 so that the motor 39 opens the jaws of electrodes 26 and 27.

Our optical device may be set, generally, for a certain kind of work by selecting the proper filter 19 and mask 17 according to the object, the heat of which is to be controlled; we may locate the optical device at any preferred distance from, direct it to any point of said object, and then focus it.

A control as to the exact temperature, at which the relay 50 is to be actuated may finally be brought about by setting the tap 44.

The filtering by filter 19 may be used to eliminate a whole range of radiant energy (the rays of the visible spectrum and ultra-violet rays for instance) the energy passing through the filter (infra-red for instance) permitting a particular reaction of the radiant energy sensitive cell at a preferred temperature.

Although we have shown and described one form of embodiment of our invention in detail, yet we do not wish to be limited thereby, except as the state of the art and the appended claims may require, for it is obvious that various modifications and changes may be made in the form of embodiment of our invention, without departing from the spirit and scope thereof.

We claim:

1. Means reacting upon the heat of an object, comprising translucent means, means focusing radiation of said object onto said translucent means, a photo-electric cell exposed to the radiation diffused by said translucent means, an enclosure containing said cell and said focusing means, and a mask exchangeably engaging said translucent means on said enclosure.

2. Means controlling the heat of an object, comprising translucent means, means focusing radiation of said object onto said translucent means, a photo-electric cell exposed to the radiation diffused by said translucent means, an enclosure containing said cell, and a mask exchangeably engaging said translucent means on said enclosure.

JOYSE PETER HUFLER.
CLARENCE P. WOOD.